United States Patent [19]

Andresen et al.

[11] Patent Number: 4,611,279
[45] Date of Patent: Sep. 9, 1986

[54] DMA ASYNCHRONOUS MODE CLOCK STRETCH

[75] Inventors: Mark E. Andresen, Norwalk; Thomas A. Kriz, Sandy Hook; Andrew S. Potemski, New Milford, all of Conn.

[73] Assignee: International Business Machines Corporation, Armonk, N.Y.

[21] Appl. No.: 485,085

[22] Filed: Apr. 14, 1983

[51] Int. Cl.⁴ .................... G06F 13/00; G06F 1/00
[52] U.S. Cl. .................................................. 364/200
[58] Field of Search ... 364/200 MS File, 900 MS File; 365/222

[56] References Cited

U.S. PATENT DOCUMENTS

| | | | |
|---|---|---|---|
| 4,050,096 | 9/1977 | Bennett et al. | 364/200 |
| 4,137,565 | 1/1979 | Mager et al. | 364/200 |
| 4,293,908 | 10/1981 | Bradley et al. | 364/200 |
| 4,300,193 | 11/1981 | Bradley et al. | 364/200 |
| 4,317,169 | 2/1982 | Panepinto, Jr. et al. | 364/200 |
| 4,365,294 | 12/1982 | Stokicen | 364/200 |
| 4,384,322 | 5/1983 | Bruce et al. | 364/200 |
| 4,400,771 | 8/1983 | Suzuki et al. | 364/200 |
| 4,400,772 | 8/1983 | Broyles et al. | 364/200 |
| 4,449,183 | 5/1984 | Flahive et al. | 364/200 |
| 4,458,308 | 7/1984 | Holtey et al. | 364/200 |
| 4,484,263 | 11/1984 | Olson et al. | 364/200 |
| 4,495,571 | 1/1985 | Staplin, Jr. et al. | 364/200 |

OTHER PUBLICATIONS

MC68000 DMA Using the MC6844 DMA Controller. The Inter-Relationship between Access Time and Clock Rate in an MC68000 System.

Primary Examiner—James D. Thomas
Assistant Examiner—William G. Niessen
Attorney, Agent, or Firm—James E. Murray

[57] ABSTRACT

An adaptively stretched clock input feature is provided on a natively synchronous DMAC device to make it support data transfers in an asynchronous bus environment. This feature effects adjustment of the DMAC transfer strobe access window as a function of data transfer (DTACK) timing. A late DTACK signal causes stretch of the clock controlled TXSTB transfer strobe to a length which will accommodate worst case memory access conditions of the asynchronous bus structure.

4 Claims, 3 Drawing Figures

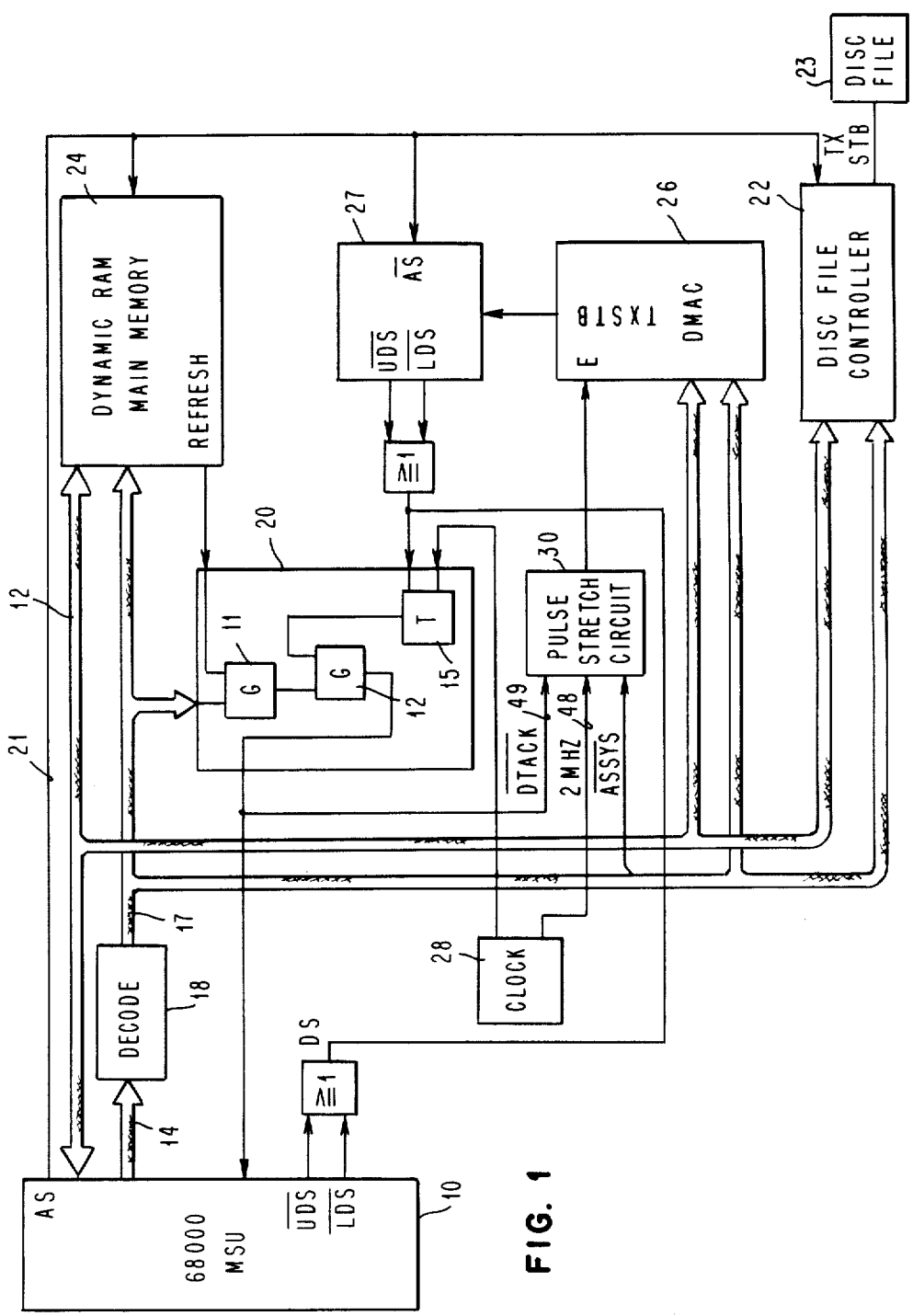

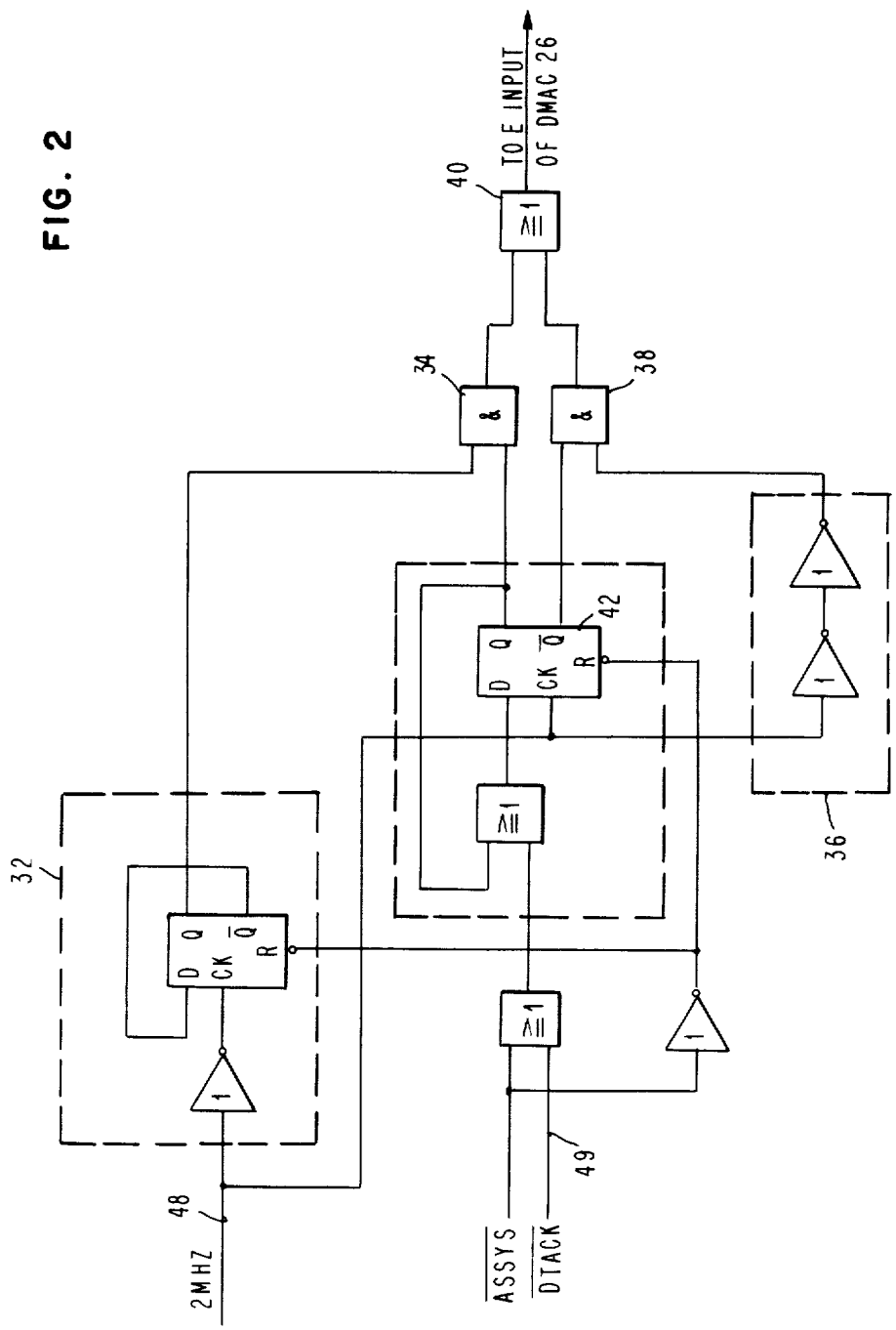

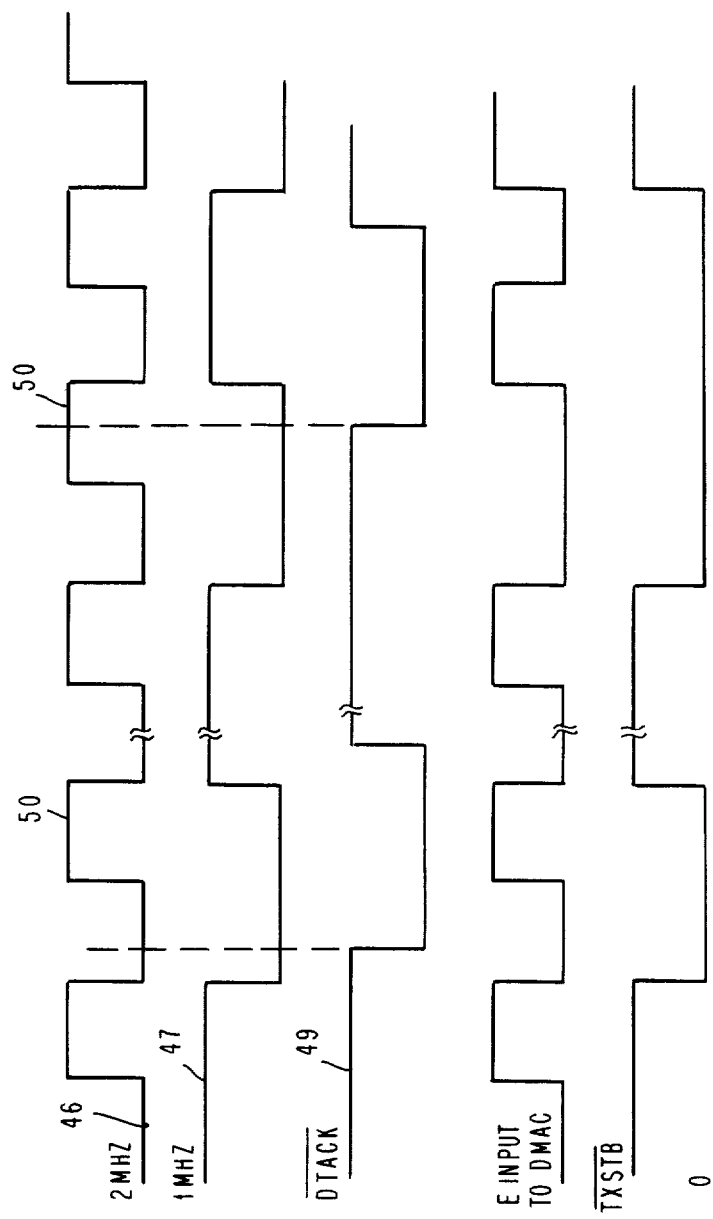

DMA ASYNCHRONOUS MODE CLOCK STRETCH

INTRODUCTION

The present invention relates to the transfer of data in a microcomputer system using a direct memory access controller (DMAC) to control the address and data busses of the system.

Direct memory access controllers (DMACs) are used in microcomputer systems to transfer data directly between peripheral devices and main memory by temporarily taking over control of the microcomputer's data and address busses from the system microprocessor unit (MPU). An example of such a DMAC is the MC6844 sold by Motorola, Inc. and described beginning on page 4-441 of their manual entitled "Motorola Microprocessing".

During a direct memory access data transfer cycle, the MC6844 DMAC generates the control signals necessary to transfer data directly between the main memory and a peripheral device in a synchronous microcomputer system. Among the control signals that are generated by the MC6844 DMAC is the transfer strobe ($\overline{\text{TXSTB}}$) signal which is described in copending U.S. Pat. No. 4,530,053 issued July 16, 1985, filed Apr. 14, 1983 and entitled "DMA Multimode Transfer Controls" can be used to generate a substitute for the address strobe ($\overline{\text{AS}}$) signal of an asynchronous microcomputer system based on the MC68000 MPU. The $\overline{\text{AS}}$ signal or its substitute generated from the $\overline{\text{TXSTB}}$ signal indicates to a peripheral device attached to the microcomputers bus system, when there is a valid address on the address bus to support execution of a data transfer cycle.

The length of the transfer window in the $\overline{\text{TXSTB}}$ signal of the MC6844 DMAC is determined by the length of the MPU clock cycle supplied to the E enable terminal of the DMAC. For example, if the MPU clock has a period of 0.5 μs then a transfer cycle of duration 0.5 μs would be executed by the DMAC. If the MPU clock had a period of 1.0 μs then the DMAC would require that time to complete a transfer. As a design objective, it is desirable to run the DMAC clock at the faster rate.

In a synchronous microcomputer system such as one using a MC6800 MPU there is no problem in operating the system at a fixed clock rate because the natively synchronous MC6844 DMAC and main memory are both synchronized to the same MPU clock and therefore the main memory and attached peripherals will be ready to perform a data transfer when the $\overline{\text{TXSTB}}$ data transfer window opens. However, this is not true in an asynchronous microcomputer system based on the MC68000 MPU. When the main memory in such an asynchronous microcomputer is made up of dynamic random access storage cells not synchronized to the MPU clock cycle, the $\overline{\text{TXSTB}}$ transfer window can occur while data in the dynamic storage cells are being refreshed or may not be of sufficient duration to transfer valid data. If these circumstances occur, one runs the risk of an invalid data transfer. It would be possible to operate the MC6844 DMAC using a fixed length MPU clock cycle of sufficiently long period for the $\overline{\text{TXSTB}}$ window to accommodate the worst case access condition. However, if the MPU clock cycle and consequently the $\overline{\text{TXSTB}}$ transfer window were increased to this length, a significant deterioration in system data transfer rate performance will occur.

BRIEF DESCRIPTION OF THE INVENTION

Therefore, in accordance with the present invention, a new mode of operation using an adaptive changing clock period is provided for DMAC type devices. The DMAC is supplied with a clock which is normally not sufficient to cover the worst case access condition. However, when the main memory data transfer acknowledgment signal is not provided by a predetermined point in the MPU clock cycle the DMAC clock and consequently the TXSTB transfer window is extended to prevent data loss.

Therefore, it is an object of the invention to rapidly transfer data between main memory and a peripheral device using an adaptively clocked DMAC.

It is another object of the invention to rapidly transfer data without the use of a software controlled microprocessor between main memory and a peripheral device in an asynchronous microcomputer system.

THE DRAWINGS

These and other objects of the invention can best be understood by reference to the accompanying drawings of an illustrated embodiment of the invention of which:

FIG. 1 is a block diagram of a data transfer system incorporating the present invention;

FIG. 2 is a logic diagram of the block entitled pulse stretcher in FIG. 1;

FIG. 3 is a series of pulse patterns occurring in the embodiment of the invention illustrated in FIGS. 1 and 2.

DETAILED DESCRIPTION

The MC68000 microprocessor 10 contains a 16 bit bidirectional general purpose data bus 12 for the transfer of data between the microprocessor 10 and a plurality of associated devices. The MC68000 microprocessor also has a 23 bit unidirectional address bus 14 capable of addressing 8 megawords of data on associated devices. The address bus signal from the mircroprocessor 10 is fed into a decoder 18 which selects a device access line and the address of a storage location. The device access line enables only one of the plurality of devices attached to the system address bus 17 to respond to the address identified by the storage location portion of the output of decoder 18.

The portion 21 of the address bus 17 containing the device access lines is fed to the DTACK generator 20. As explained in co-pending U.S. patent application Ser. No. 470,025, filed Feb. 25, 1983 and entitled "Centralized Generation of Data Transfer Acknowledge Pulses for Microprocessors", the DTACK generator 20 supplies a pulse to regulate the length of the data transfer cycle of the microprocessor 10. The timing of this DTACK pulse relative to the $\overline{\text{UDS}}$ and $\overline{\text{LDS}}$ pulse varies as a function of the response time of the device transmitting or receiving data from the microprocessor 10 during the data transfer cycle. The timing is generated by a counter which starts its count on the occurrence of $\overline{\text{UDS}}$ or $\overline{\text{LDS}}$ pulse. When the count fills a stage of te counter accessed by the device involved in the transfer, the $\overline{\text{DTACK}}$ signal is given.

In a typical processor controlled transfer of data from a disc file 23 through a controller 22 to main memory 24, the microprocessor 10 will provide access data on address bus 14. Decoder 18 will then generate an access signal for the file and a data address in the file. A data item will then be transferred from the file to the microprocessor 10 and the DTACK generator 20 will provide a $\overline{\text{DTACK}}$ signal to the processor at the completion of the transfer. The microprocessor 10 then starts a MPU sequence that ends in termination of the data transfer cycle $\overline{\text{AS}}$.

A second data transfer cycle may then be executed by the microprocessor 10. This time the transfer is from the microprocessor 10 to the RAM main memory 24 to place in main memory 24 the data item received from the file on the previous cycle. The microprocessor places an address on bus 14 which is decoded by decoder 18 into access line for main memory 24 and an address location in main memory. The data is then transferred to that address and at the completion of the transfer the $\overline{\text{DTACK}}$ generator provides a $\overline{\text{DTACK}}$ signal to the microprocessor 10 so the microprocessor can terminate the data transfer cycle.

The timing of the $\overline{\text{DTACK}}$ signal for the main memory dynamic RAM 24 is dependent on the refresh cycle of the RAM 24. The $\overline{\text{DTACK}}$ generator 20 contains a gate 11 which gates the system bus access line for the RAM 24 with the refresh strobe from the RAM 24 so that the $\overline{\text{DTACK}}$ signal will not come up until the refresh cycle is complete. This may occur before or after gate 13 has been enabled by the appropriate signal from the $\overline{\text{DTACK}}$ timer 15.

From time to time, control of the busses may be turned over to the DMAC 26. The DMAC 26 must be pre-loaded with the starting address of the transfer and the number of bytes to be transferred etc. As indicated previously with the bus is operating in a direct memory access mode of operation, data does not pass through the DMAC. Data passes instead directly between the main memory 24 and the file 23. What the DMAC does do in association with a multimode circuit 27 described in detail in the previously mentioned U.S. Pat. No. 4,530,053, entitled "DMA Multimode Transfer Controls", is generate the signals to control the data and address buses. Among these signals is the substitutes for the $\overline{\text{UDS}}$ and $\overline{\text{LDS}}$ and $\overline{\text{AS}}$ generated from the transfer strobe $\overline{\text{TXSTB}}$. As shown in FIG. 3, the length of the $\overline{\text{TXSTB}}$ transfer window is determined by the cycle time of the signal provided to the E enable input terminal of the DMAC 26. The input signal to the E input terminal is provided by the pulse stretch circuit 30 shown in detail in FIG. 2.

Referring now to FIGS. 2 and 3, latches 42 and 48 are latches whose state is determined on the occurrence of a positive pulse at the clock (CK) terminal. If the data (D) terminal is positive at that time the Q output will go positive if the D terminal is zero the $\overline{\text{Q}}$ output will go positive.

The latch 48 is wired to form a frequency divider 32. A 2 mhz MPU clock signal 46 from clock source 28 is fed through an inverter into the CK terminal of latch 48 to generate a 1 mhz clock signal that is fed into AND gate 34. The 2 mhz clock is also fed through a delay circuit 36 into AND gate 38 so that there are synchronized, inphase 1 mhz and 2 mhz clocks at the inputs of AND gates 34 and 38 respectively.

The outputs of the two AND gates 34 and 38 are fed through an OR gate 40 to the E input of the DMAC 26. The selection between the 1 mhz and 2 mhz clocks by AND gates 34 and 38 depends on the state of control latch 42. The state of the control latch 42 in turn depends on when the output 49 of the DTACK generator 20 drops in relation to the 2 mhz MPU clock cycle. If the DTACK pulse drops before the positive portion 50 of the 2 mhz clock cycle 46 occurs, the trigger 42 remains in the $\overline{\text{Q}}$ state and the 2 mhz signal is transmitted to the E input of the DMAC so that the TXSTB output of the DMAC 26 provides a 0.5 μs access window 51. If the $\overline{\text{DTACK}}$ is still up during the positive portion 50 of the 2 mhz clock cycle, the trigger 42 switches to the Q state, transmitting the 1 mhz clock to the E input so that $\overline{\text{TXSTB}}$ signal does not rise for 1 μs. During a DMAC controlled transfer the access for the disk file controller is not generated from the normal decode signal so that the RAM access line is the only active line into the DTACK generator 20 at that time. Thus, the access window can be adaptively lengthened when needed.

The assume system ($\overline{\text{ASSYS}}$) signal is the DMAC access line pulse generated by the decode circuit 18 in response to the address placed on the line by the 68000 MPU 10. $\overline{\text{ASSYS}}$ signal goes back up when the 68000 MPU 10 retakes control of the busses 12 and 14 from the DMAC 26. At that time both latches 42 and 48 are reset to the $\overline{\text{Q}}$ state.

Above we have described one embodiment of the present invention. Obviously a number of changes can be made in the embodiment without departing from the spirit and scope of the invention as considered in the accompanying claims.

Having thus described our invention, what we claims as new and desire to secure by Letters Patent is:

1. In a microprocessor controlled data processing system including a bus for data, address and control signals, a system clock, an asynchronous microprocessor which generates a valid data control signal to indicate that valid data is on the bus and responds to a data transfer acknowledgment signal to regulate the length of a data transfer, a dynamic random access memory which provides a refresh signal while data is being refreshed in the memory, and I/O device running asynchronously of the memory, and direct memory access control means for bypassing the microprocessor in the transferring of data between the memory and the I/O device during a repetitively recurring fixed length transfer window signal generated by said direct memory access control means from a cyclical timing signal of the system clock, the improvement comprising:

data transfer acknowledgment means having gate means responsive to said refresh signal, said transfer window signal and said valid data control signal for inhibiting the generation of a transfer acknowledgment signal while the memory is being refreshed or until valid data is available, logic means responsive to the generation of said transfer acknowledgment signal for extending the length of said transfer window signal to permit completion of the data transfer when the occurrence of said refresh period or late availability of valid data prevents completion of a data transfer during a transfer window signal of normal length.

2. The data processing system of claim 1 wherein said logic means includes frequency divider means for generating a synchronized timing signal of reduced frequency from the cyclical timing signal, logic circuit means for providing either said cyclical timing signal or said synchronized timing signal to said direct memory access control means depending on when said transfer acknowledgment signal occurs during the period of said cyclical timing signal.

3. The data processing system of claim 2 wherein said logic means includes switch means responsive to said cyclical timing signal and said transfer signal to provide said cyclical timing signal to said direct memory access control means except when said transfer completion signal first occurs during the second half of said transfer window.

4. The data processing system of claim 2 wherein said data transfer acknowledgment means is a centralized unit that generates a transfer completion signal for any of the devices receiving data in said data processing system except said processor.

* * * * *